UNITED STATES PATENT OFFICE.

HENRY BLOUNT HUNTER, OF NORFOLK, VIRGINIA.

PROCESS OF TREATING COCOA.

1,076,122.   Specification of Letters Patent.   Patented Oct. 21, 1913.

No Drawing.   Application filed October 11, 1912. Serial No. 725,210.

*To all whom it may concern:*

Be it known that I, HENRY BLOUNT HUNTER, a citizen of the United States, residing at Norfolk, in the county of Norfolk and State of Virginia, have invented certain new and useful Improvements in Processes of Treating Cocoa, of which the following is a specification.

This invention relates to an improved process of treating fluid or semi-fluid preparations of cocoa to improve the flavor and texture of the product.

In carrying out my improved process, I prepare a syrup of cocoa which may be done in the usual way as, for example, by mixing together in a kettle or other suitable container sugar, water, and cocoa, and, if desired, such other substances as I may wish to add.

These ingredients are then heated in the kettle to a temperature of not above 80° C. so as not to volatilize any of the aromatic ingredients, but sufficiently to convert the starchy matter in the cocoa into an emulsifying agent, and after the whole has been thoroughly "worked" in said container by means of any suitable stirring device, it is transferred to a hermetically sealed container, preferably made of tin plate, in which it is subjected to a temperature of between 100 and 125° C. for such length of time as is found necessary to bring about certain desirable changes in the flavor of the cocoa used. This last mentioned heating is preferably effected by subjecting the container to heat in an autoclave by means of steam under pressure.

In making the syrup in the kettle or other vessel before placing in the sealed container, it is immaterial whether this vessel be closed or not, since the temperature to which the ingredients are subjected is not sufficient to effect volatilization of the aromatic principles. When, however, the mixture is subjected to the temperature of between 100 and 125° C., the container is hermetically sealed so that the flavors produced cannot volatilize.

What I claim is:

1. In the process of treating cocoa, the steps which consist in mixing an aqueous fluid therewith and subjecting the mixture in a closed vessel to a temperature of between 100° and 125° centigrade and above the boiling point of said mixture for a sufficient time to bring about changes in the flavors thereof.

2. In the process of treating cocoa, the step which consists in subjecting a syrup of cocoa to a temperature of between 100° and 125° centigrade and above the boiling point of said syrup within a hermetically sealed container for a sufficient time to bring about changes in the flavors of said syrup.

3. The process of treating cocoa, which consists in heating cocoa together with an aqueous liquid to a temperature sufficient to convert the starchy matter present in the cocoa into an emulsifying agent, but keeping the temperature as low as possible in order to bring about this result, then heating the mixture thus treated in a hermetically sealed container to a temperature of above 100° centigrade and above the boiling point thereof for a sufficient time to bring about changes in the flavors of said mixture.

In testimony whereof I affix my signature in presence of two witnesses.

HENRY BLOUNT HUNTER.

Witnesses:
P. K. SCOTT,
E. B. JOHNSON.